United States Patent
Betts-Lacroix et al.

(10) Patent No.: US 10,634,548 B1
(45) Date of Patent: *Apr. 28, 2020

(54) STERILIZABLE WIRELESS ANIMAL SCALE

(71) Applicant: Vium, Inc., San Mateo, CA (US)

(72) Inventors: Jonathan Betts-Lacroix, Belmont, CA (US); Alexander Izvorksi, San Francisco, CA (US); Kevin Harada, San Mateo, CA (US)

(73) Assignee: Vium, Inc, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/419,984

(22) Filed: Jan. 30, 2017

Related U.S. Application Data

(63) Continuation of application No. 14/631,230, filed on Feb. 25, 2015, now Pat. No. 9,671,276.

(51) Int. Cl.
*G01G 21/28* (2006.01)
*G01G 19/00* (2006.01)
*G01G 21/22* (2006.01)
*A01K 29/00* (2006.01)
(Continued)

(52) U.S. Cl.
CPC ............ *G01G 21/28* (2013.01); *A01K 1/031* (2013.01); *A01K 29/00* (2013.01); *G01G 19/00* (2013.01); *G01G 21/22* (2013.01); *H04Q 9/00* (2013.01); *H04Q 2209/40* (2013.01)

(58) Field of Classification Search
CPC .... G01G 19/52; G01G 21/22; G01G 23/3728; A01K 1/015; A01K 1/031
See application file for complete search history.

(56) References Cited

U.S. PATENT DOCUMENTS

| | | | | |
|---|---|---|---|---|
| 4,884,645 A | * | 12/1989 | Knothe | G01G 21/28 177/180 |
| 5,895,894 A | * | 4/1999 | Zumbach | G01G 21/30 177/124 |

(Continued)

FOREIGN PATENT DOCUMENTS

| | | | | |
|---|---|---|---|---|
| JP | H08-178736 | * | 7/1996 | G01G 21/28 |
| JP | 2005283328 | * | 10/2005 | G01G 1/24 |

OTHER PUBLICATIONS

English translation of JP-H08-178736.*
English translation of JP-2005283328.*

*Primary Examiner* — Natalie Huls
(74) *Attorney, Agent, or Firm* — Kim Rubin Patent Agent

(57) ABSTRACT

A wireless, sterilizable scale comprising an upper module, on which an animal sits or explores, and a lower module that measures the weight of the animal. The lower module comprises a flexible membrane, through which the weight of the upper module and the animal is mechanically coupled. The flexible membrane is affixed at its perimeter to the perimeter of the lower module. The lower module is sealed by the membrane and comprises a load cell, batteries and electronics. The upper module removes easily from the lower module leaving the lower module intact and sealed for chemical sterilization. Electronics in the upper module connects to electronics in the lower module via an electrical connector that also penetrates the flexible membrane. IR communications from the upper modules transmits a series of weight values at two different data rates. The scale may be in a sterile cage free of electrical penetrations.

2 Claims, 11 Drawing Sheets

(51) Int. Cl.
*A01K 1/03* (2006.01)
*H04Q 9/00* (2006.01)

(56) References Cited

U.S. PATENT DOCUMENTS

| | | | |
|---|---|---|---|
| 8,796,565 B2 * | 8/2014 | Lauer | G01G 21/28 |
| | | | 177/243 |
| 8,797,166 B2 * | 8/2014 | Triener | G01G 17/08 |
| | | | 340/573.1 |
| 9,671,276 B1 * | 6/2017 | Betts-Lacroix | G01G 21/28 |
| 2012/0085291 A1 * | 4/2012 | Conger | A01K 1/0047 |
| | | | 119/419 |
| 2014/0251228 A1 * | 9/2014 | Jensen-Jarolim | A01K 29/005 |
| | | | 119/421 |
| 2016/0069737 A1 * | 3/2016 | Canwell | G01G 21/28 |
| | | | 177/238 |
| 2016/0231167 A1 * | 8/2016 | Masin | G06K 7/10386 |
| 2017/0105385 A1 * | 4/2017 | Betts-Lacroix | A01K 1/031 |
| 2017/0108368 A1 * | 4/2017 | Harada | G01G 19/00 |
| 2017/0108369 A1 * | 4/2017 | Harada | G01G 17/08 |
| 2018/0103617 A1 * | 4/2018 | Izumo | A01K 29/00 |

* cited by examiner

STERILIZABLE WIRELESS ANIMAL SCALE

This specification is a continuation of Ser. No. 14/631,230.

FIELD OF THE INVENTION

The invention relates to sterilizable, wireless scale such at might be used in a vivarium cage.

BACKGROUND

Vivariums house a number of animals, typically test animals, such as mice, in a number of cages, often a large number. The test animals are frequently used test drugs, genetics, animal strains, husbandry experiments, methods of treatment, procedures, diagnostics, and the like. We refer to all such uses of a vivarium as a study.

Regular weighing of animals is an important part of studies. In the prior art, weighing was labor intensive and often the handling of the animals changed their behavior or their health, changing the results or quality if the study. Handling of animals by humans to weight them comprised the sterility of the cages and animals, and put the health of the animals and workers at risk.

Such manual weight recording is inherently infrequent due to the high labor time and cost. This infrequency creates three weakness of the prior art. First, problems may not be discovered until after an unacceptable delay, such as failure to eat. Second, subtle behavior or health attributes, such as an animal's eating schedule, will be missed. Third, manual observation requires light for the observer. For many animals, the light interferes with and alters their behavior and health, and thus alters the results of the study compared with animals in their natural lighting regimen.

Vivarium cages are normally pathogen-free. Animals and thus their cages must be isolated from outside pathogens or contamination and from pathogens or contamination from other animals or other cages. This presents a significant challenge to vivarium automation and in particular to in-cage animal weighing and automatic animal identification. Electronic equipment placed inside a cage may need to be discarded after a single study due to the inability to sterilize the equipment between studies. Such equipment may be an animal ID sensor, a scale, or a wireless transmitter. In addition, in order to keep the cages pathogen-free it is desirable to have as few cage penetrations as possible. This means that power or data wiring to electronic equipment inside the cage is undesirable. Although this requirement motivates wireless devices, these devices must then be battery powered, which adds to cost, size and weight, and may introduce pathogens. Batteries may have to be changed out during a study, which adds to both equipment and labor costs, and may introduce pathogens.

Sterility or pathogen free is important in vivariums to assure the health of the animals and the health of the workers. Also, sterility is critical for accurate, consistent, credible and repeatable study results. Sterility refers to the sufficient restriction of pathogens so as to not so affect the outcome of the study or health or behavior of animals or people. Sterility also refers to husbandry attributes, supplies and usage, as well as health.

BRIEF DESCRIPTION OF THE INVENTION

One embodiment of a wireless, sterilizable scale comprises an upper module, on which the animals sits, crawls or explores, and a lower module that measure measures the weight of the animal on the upper module. The upper module comprises a flexible membrane on its top surface, through which the weight of the upper modules and animal are mechanically coupled. The lower module comprises three load cells arranged in a triangle so as to support the upper module, through the membrane, such that its tilt is limited. The tilt is limited to maintain measured weight on the load cells within the specified accuracy of the scale. The lower module is sealed and comprises the load cells, batteries and electronics. The lower module may be chemically sterilized. The upper module is sealed using a conformal coating on at least a portion. The upper module may be sterilized using heat sterilization. The upper module may comprise electronics; however, the electronics are not damaged by heat of sterilization.

DETAILED DESCRIPTION OF THE INVENTION

Figure 1:
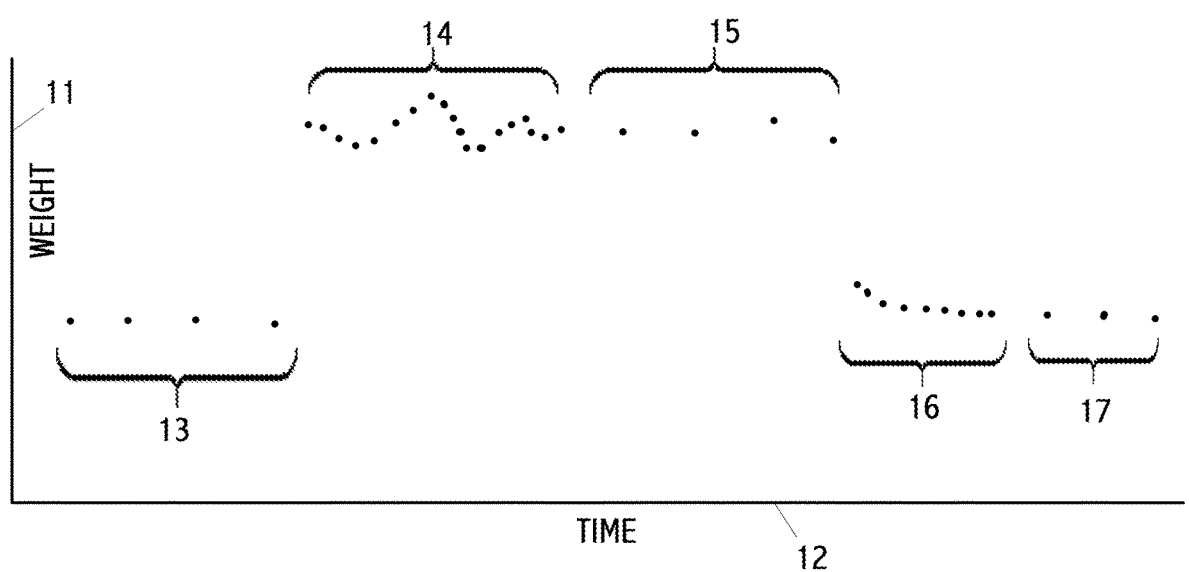
FIG. 1 shows an exemplary sequence of transmitted weight values.

One embodiment of a wireless, sterilizable scale comprises an upper module, on which the animals sits, crawls or explores, and a lower module that measure measures the weight of the animal on the upper module. The upper module comprises a flexible membrane on its top surface, through which the weight of the upper modules and animal are mechanically coupled. The lower module comprises three load cells arranged in a triangle so as to support the upper module, through the membrane, such that its tilt is limited. The tilt is limited to maintain measured weight on the load cells within the specified accuracy of the scale. The lower module is sealed and comprises the load cells, batteries and electronics. The lower module may be chemically sterilized. The upper module is sealed using a conformal coating on at least a portion. The upper module may be sterilized using heat sterilization. The upper module may comprise electronics; however, the heat of sterilization does not damage the electronics.

Such a scale is suitable for use in a sterile animal cage that is free of electrical penetrations.

One embodiment uses IR (infrared) transmitters, which may also be transceivers. The IR communications may be through an IR transparent top of the animal cage. The IR optical path may be restricted with tubes or lenses to restrict the amount of stray IR light, which might comprise IR-sensitive cameras. The IR spectrum may be restricted to an IR range for which cameras are not sensitive. The IR communication may be modulated such that lower power is needed, so that this IR light is dim enough to not interfere with cameras.

One embodiment only transmits weight values when it receives wirelessly a command to do so.

One embodiment only transmits weight values when the weight on the scale changes more than a predetermined amount: absolute or relative change; increased or decreased weight. A series of weights may pass through a smoothing or averaging function prior to transmission. Such a function may minimize sudden apparent changes in weight to movement of the animal being weighed. This function maybe used in the data path for weight value transmissions, or may be used in the data path to detect a change of weight that triggers a new transmission, or both.

One embodiment transmits a first series of weight values during a first time interval, at a first time spacing between values; then, transmit a second series of weight values during a second time interval, at a second time spacing between values. For example, weighs may be transmitted at eight samples/sec for two seconds, then at one sample per second for ten seconds.

One embodiment uses the transmitted scale weight in conjunction with an animal ID sensor. Such an animal ID sensor may be RF ID, capacitive using the top module, ECG electrical contacts on the top of the upper modules, or one or more camera images. If RFID is used, an RFID chip may be on the animals' ear; the RFID receiver may be in the scale or outside the animal cage. Numerous other forms of animal ID are known in the art.

One embodiment has a downward facing connected lip surrounding all or part of the surface of the upper module. Such a lip may or may not fit over a mating recess in the top of the lower module. The lip minimizes any contamination or matter that might enter the scale between the upper and lower modules.

One embodiment uses one or more connectors between the upper and lower modules. The female half of the connector may be in the upper module and the male half in the lower module. This configuration prevents an amount of chemical sterilization liquid from entering the female half of the connector because that half is on the heat-sterilized module.

One embodiment comprises one or more IR transceivers in the upper module, facing upward. IR transmissions to and from these transceivers may be through a transparent cage top. Many other forms and configurations of wireless communication are known in the art.

One embodiment of a system of measurement and a method of measurement uses the sterile, wireless scale in an animal cage that uses an animal ID to associate and record weights on the scale with specific animals in a cage with more than animal.

All embodiment and combinations may be used in a vivarium.

Turning now to FIG. 1, we see an exemplary sequence of transmitted scale weights. Such transmission may occur only when the scale receives a command to do so. Here, each dot represents one transmitted scale weight. The vertical axis, 11, shows the weight value. The horizontal axis, 12, is the time axis. Group 13 shows a low rate of transmittal of an empty scale. Group 14 shows a high rate of transmittal of an animal on the scale. Note the variation in weights do to animal motion. Group 15 shows a low rate of transmission, with the animal on the scale. Group 16 shows a high rate of transmission as the animal leaves the scale. Group 17 shows a low rate of transmission after the animal has left the scale. The scale may transmit only when a change in weight is detected, such as the change from weight shown in group 13 to group 14 and again at the change in weight from shown in group 15 to group 16. On command, the scale may transmit one weight value, a status, a series of weight values, or no weight values if the weight has not changed more than a threshold change amount from the previous weight transmission.

Figure 2:
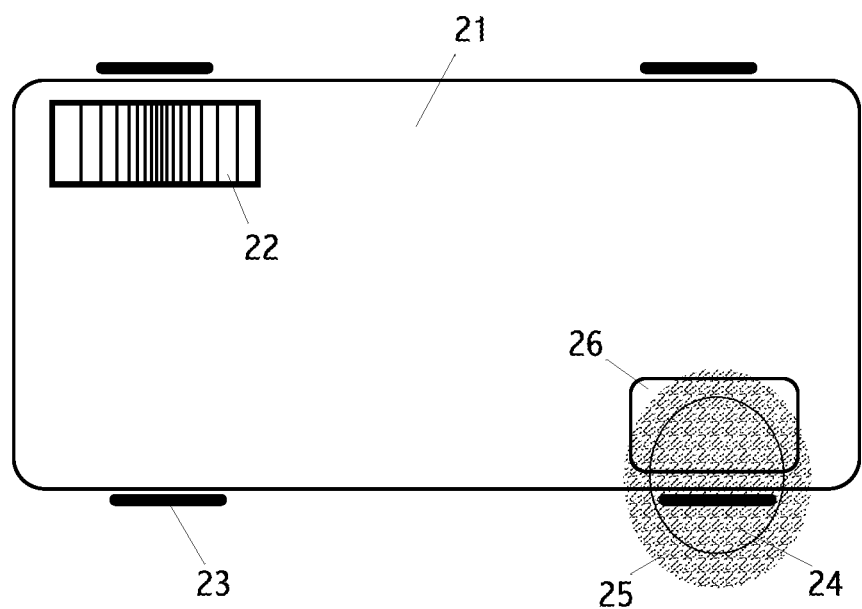
FIG. 2 shows an exemplary overhead view of an animal cage comprising a wireless, sterilizable scale.

Turning now to FIG. 2, we see a simplified to view of a cage, 21, equipped with a wireless, sterilizable scale, 26. The cage also contains a wheel, 22, and water and food, not shown. In this Figure, four RFID sensors, 23, are shown external to the cage, 21. One of the sensors, lower right, has a read range covers at least a portion of the scale, 26. On One such range is shown as area in the ellipse, 24. Another possible read area is shown as the pattern, 25. In one embodiment a rigid support, not shown, positions equipment such as the wheel, 22 and the scale 26, is desired cage locations. This rigid support may be configured such that it fits securely in the cage bottom in only one (or two) locations, effectively locating the elements it supports or positions in consistent known locations, such as those shown for 22 and 26. Such a support may be a single piece of plastic as a bar with a "Y" split at each end of the bar. Such a shape has each tip of the two "Y" ends touching each of the four walls of the cage, 21. Support or positioning for the element may be via pins, recesses, holes, or other simple alignment mechanisms. Ideally both the bar and the elements it support may be lifted out of the cage without the use of tools.

Figure 3:
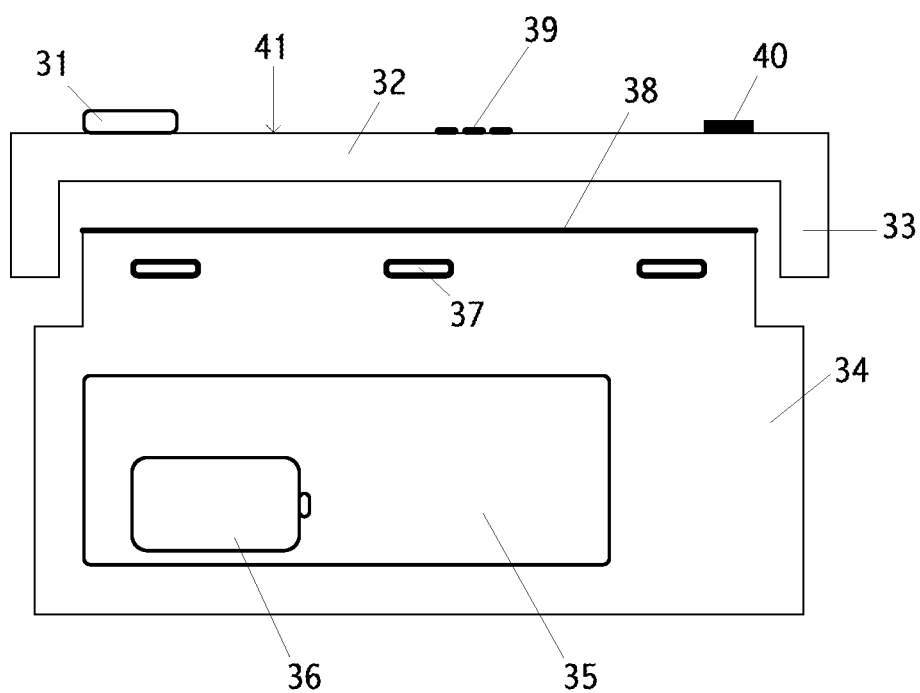
FIG. 3 shows an exemplary side view of a wireless, sterilizable scale.

Turing now to FIG. 3 we see one non-limiting side view of a wireless, sterilizable scale embodiment. The top module, 32, supports the animal being weighed. The bottom module, 34, comprises electronics, 35, and battery or batteries, 36. Three load cells are shown 37, although other numbers of load cells may be used. The three load cells are ideally arranged in a triangular configuration, as viewed from the top, so as to provide mechanical support for the upper modules, 32, such that it's tilt is limited so as to maintain both clearance between its lips, 33 from the lower module, 34, and also such that the measured weight on the load cells is within the specified accuracy of the scale. Lip 33 may also be called a skirt or a rim. All or a portion of the lip, 33, may be metal or another non-chewable material. One embodiment makes the curved surfaces of 33, including edges and corners, of sufficiently large radius that they are not chewable by the animals in the cage in which the scale is placed. Such a curved surface is not shown in this Figure.

A key embodiment is the use of flexible membrane, 38, on the top of the lower module, 34. The weight on the upper module, 32, is mechanically coupled through the flexible membrane, 48, to the load cells, 37. The membrane is sealed around its perimeter so that the lower module may be chemically sterilized.

One embodiment uses IR transceivers, which may alternatively by transmitters, 31. In this embodiment the IR optical communication is upwards, and may be through an IR transparent cage cover. Any electrical connections between the upper module, 32 and the lower module, 34, are not shown in this FIG. 3.

FIG. 3 also shows embodiments using a radio antenna, 39. Such a radio antenna may or may be directional. It may or may not be on the weighing surface. It may be on the bottom or the external sub-module, 33, or inside the case, 34, or on the platform. The radio antenna may be directional, as those trained in the art know, with one or more, or a portion of peak gain pointing upwards from the scale. Directional antennas include phased arrays, parallel antenna elements, a polarizing configuration, and other directional designs. The antenna may be near-field or far-field. Another embodiment uses a directional antenna outside, such as above, an animal cage in which the scale is placed. A radio system using such an antenna, 39, may be designed with fixed end-to-end gain, including transmit and receive electronics, so as to minimize interference from radio system in adjacent or nearby animal cages. Yet another embodiment uses distinct channels or codes transmitted data with a cage ID. Unique cage ID permits an area-based radio system, such as WiFi, rather than a set of point-to-point radio connections.

FIG. 3 also shows an accelerometer incorporated into the scale, 40. Such an accelerometer is useful for measuring attributes of animals on the scale, including such subtle attributes as tremors, spasms, comprised, slowed or agitated activity. Placing the accelerometer on the external sub-module, 33, has the unique advantage (as compared to placement on the platform, for example) as being more sensitive to the more subtle animal motions as described above. Elements 31, 39 and 40 may or may not be on the weighing surface. They may be covered with a protection layer, such as a conformal coating, or placed below the weighing surface, 41.

Figure 4:
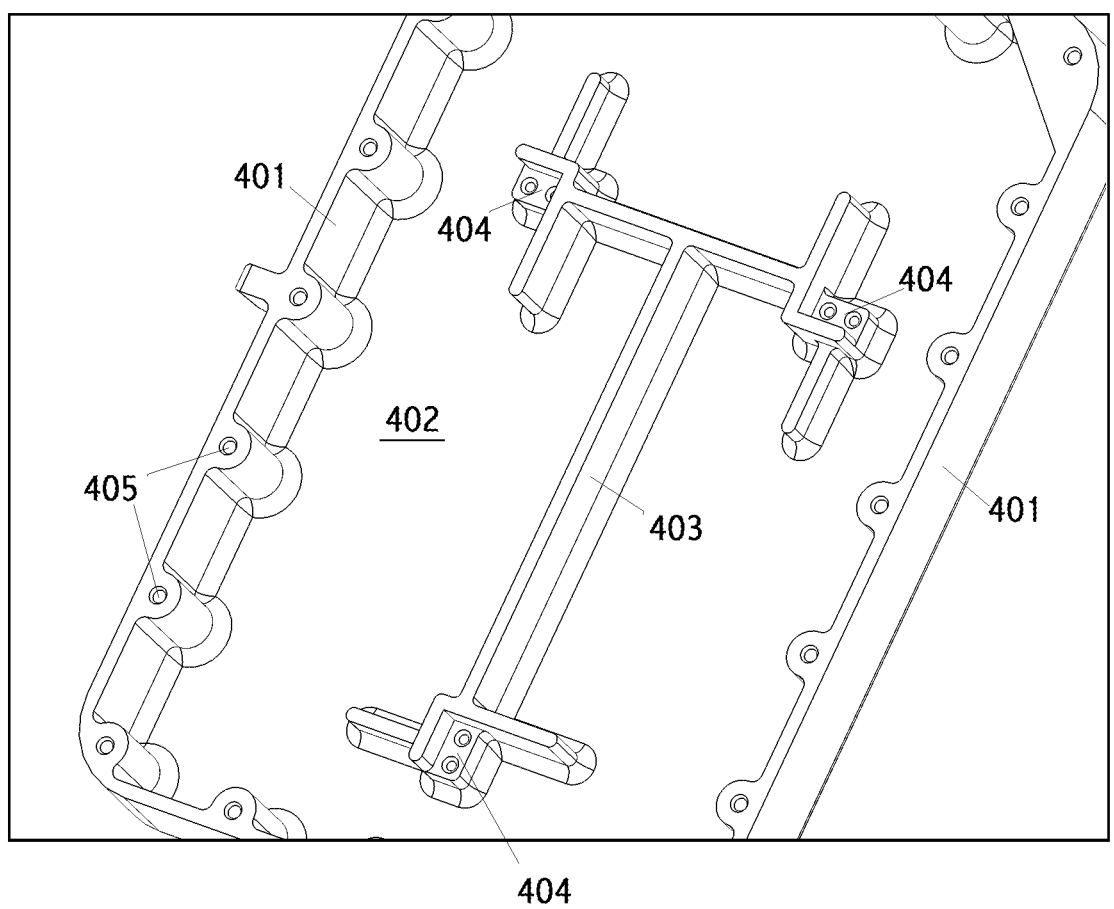
FIG. 4 shows a perspective view from the top of an exemplary open case.

Turning now to FIG. 4, we see a portion of a perspective view of the case. 401 shows the walls of the case. 402 shows the floor of the case, the reverse side of which is the bottom of the assembled scale. 403 shows a rigid portion, here molded as part of the case, her here in the shape of a "T", which provides rigidity between the three load cells so that summing the values from the load cells provides a consistent and accurate weight, and so that distortion of the case or scale between the load cells is minimized. 404 shows the mounting locations of three load cells. Visible at 404 are two screw receptacles. In one embodiment two screws secure each end of a load cell. The fixed, or non-moving end of the load cells are mounted at 404.

Figure 5:
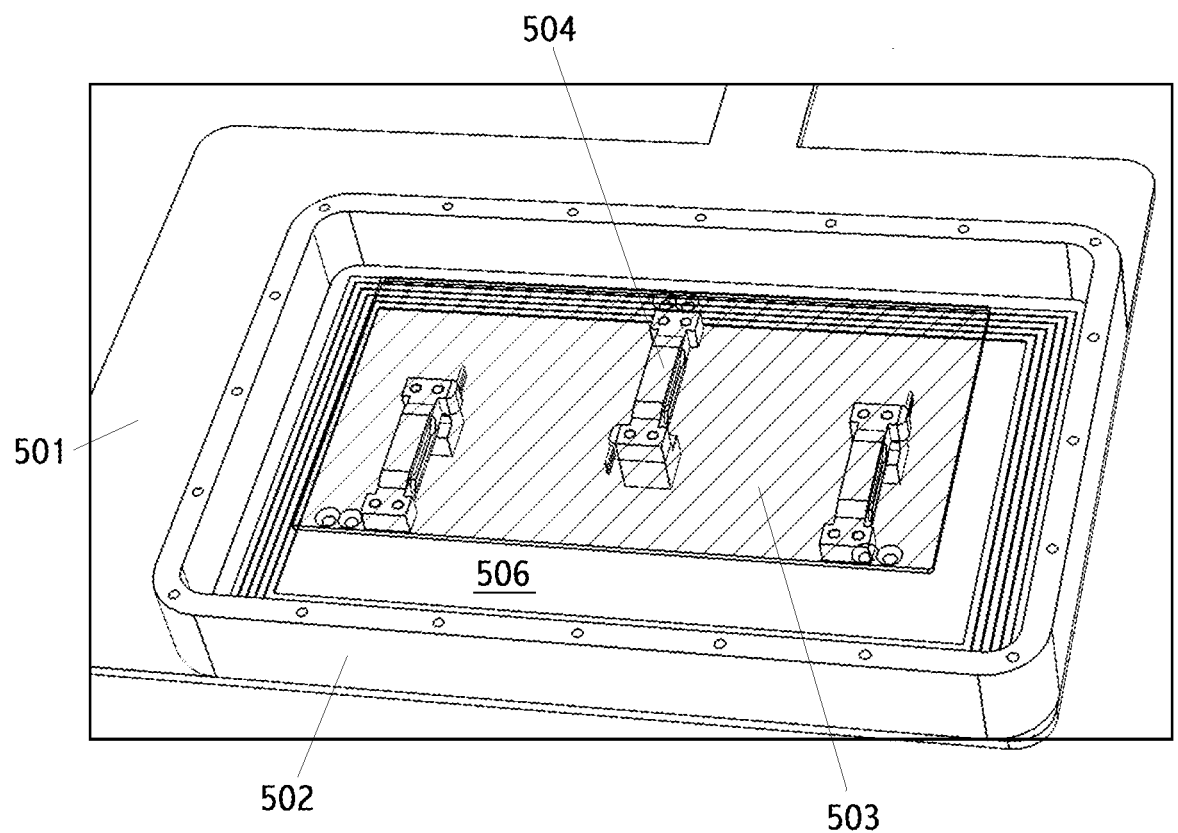
FIG. 5 shows perspective view from the top of an exemplary open case with load cells and a platform.

Turning now to FIG. 5, we see a perspective view of a case with the weighing platform, 503, shown as hatched and partially transparent so that three load cells, 504 are visible through the platform 502. 501 is a mount, which is optional for the case or scale. 50 is the inside floor of the case. 502 is a wall of the case. The platform, 503, may be a plate, or a more complex shape. The platform, 503, may be minimal; indeed, it may be no more than non-physical, conceptual element between the one-or-more transfer points and the free end of the load cell(s). This minimal or zero platform might be used in a single load-cell embodiment. The platform may also be considered, in such an embodiment, as the contact surface(s) of the one-or-more transfer points.

Figure 6:
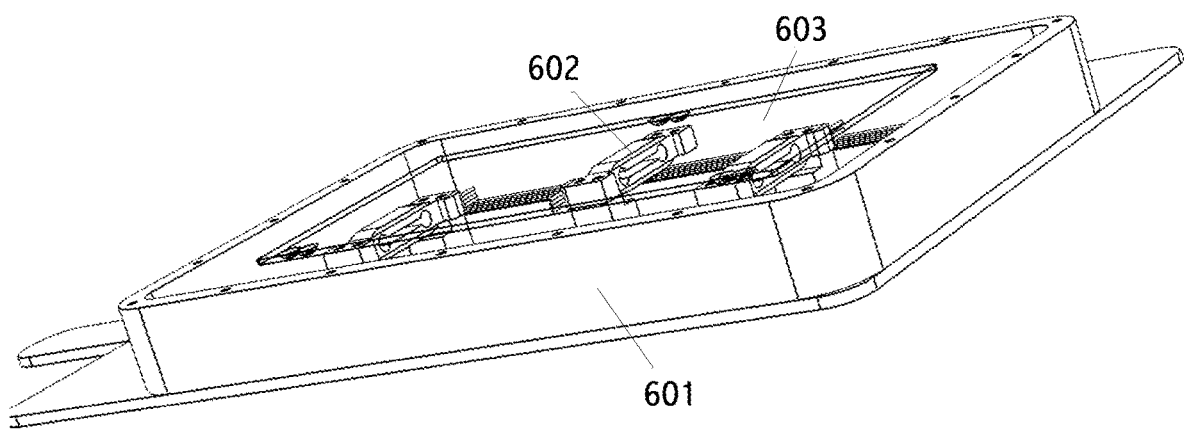
FIG. 6 shows second perspective view from the top of an exemplary open case with load cells and a platform.

Turning now to FIG. 6, we see another perspective view of the case with the weighing platform 603. 601 is a wall of the case. Three load cells are visible, here, more clearly beneath the platform 603 than in FIG. 5. The fixed ends of the load cells are rigidly mounted, directly or indirectly, to the case, 601. The floating end of the load cells is mounted rigidly, directly or indirectly, to the platform. Here, a pair of countersunk holes for flat-head screws is visible. Such screws are sued to secure the platform to the load cells.

Figure 7:
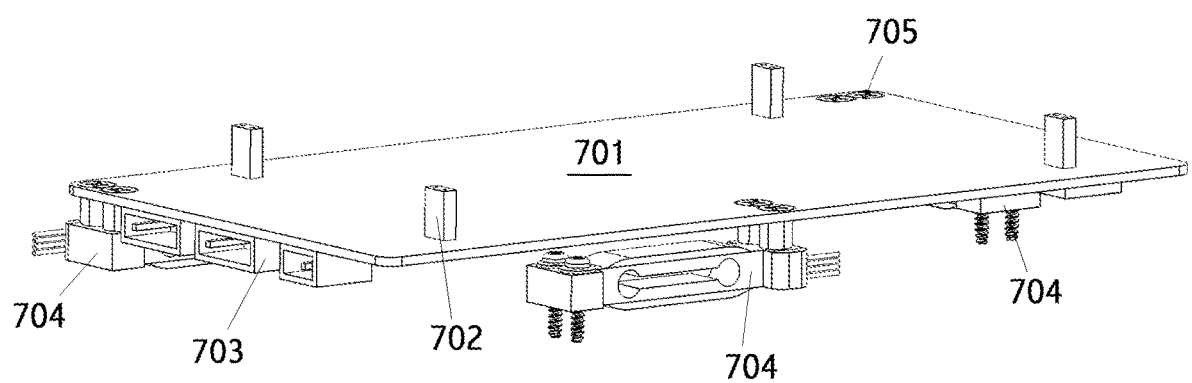
FIG. 7 shows an exemplary perspective view of a platform, load cells, and transfer points, here connectors.

Turning now to FIG. 7, we see another view of the platform 701. Four lower connectors are visible, one marked as 702. Three electrical connectors on the platform are visible, 603. The platform, 701, may be or may comprise a circuit board. Portions of three load cells are visible, 704.

Here, the platform is secured to the floating ends of the load cells, using a pair of screws, 705, for each load cell. The fixed ends of the load cells are visible, with two screws at the fixed end of the load cells visible.

Figure 8:
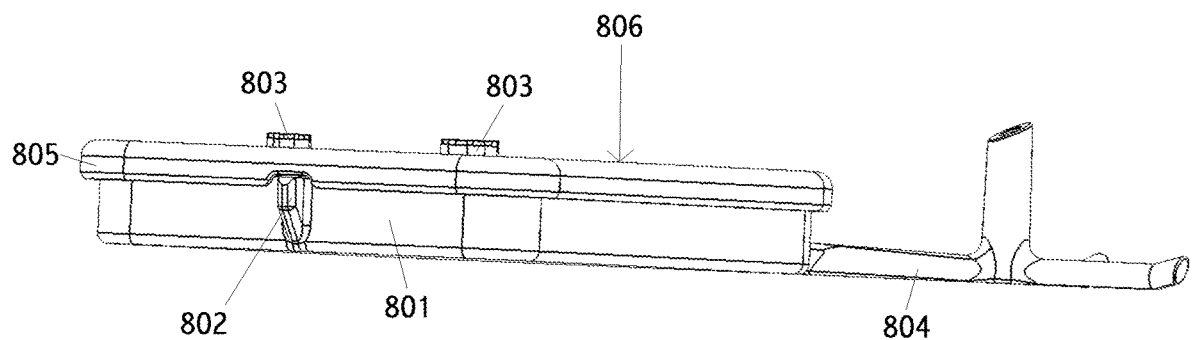
FIG. 8 shows an exemplary side view of a scale, upward facing communication elements, and positioning arm

Turning now to FIG. 8, we see a side view of an assembled scale. 801 is a wall of the case. 805 is a skirt around the weighing surface 806. 803 show two groups of communication LEDs. Here an open case is visible surrounding each group of LEDs or IR sensors. More than one LED and sensor may be used so as to provide better reliability, since the LEDs or sensors may become soiled or covered with urine, feces or bedding. Or an animal may temporarily obscure them. 802 shows a reinforcing column for the edge of the case 801. This column 802 may also be used to help position the scale against the side of an animal cage. 804 is an optional locating arm for the scale. Such an arm is useful for consistent and accurate positioning of the scale in a cage. The arm, 804, may also be used to support or position other cage elements. Elements 804, 805 and 806 may be disposable, in any combination.

Figure 9:
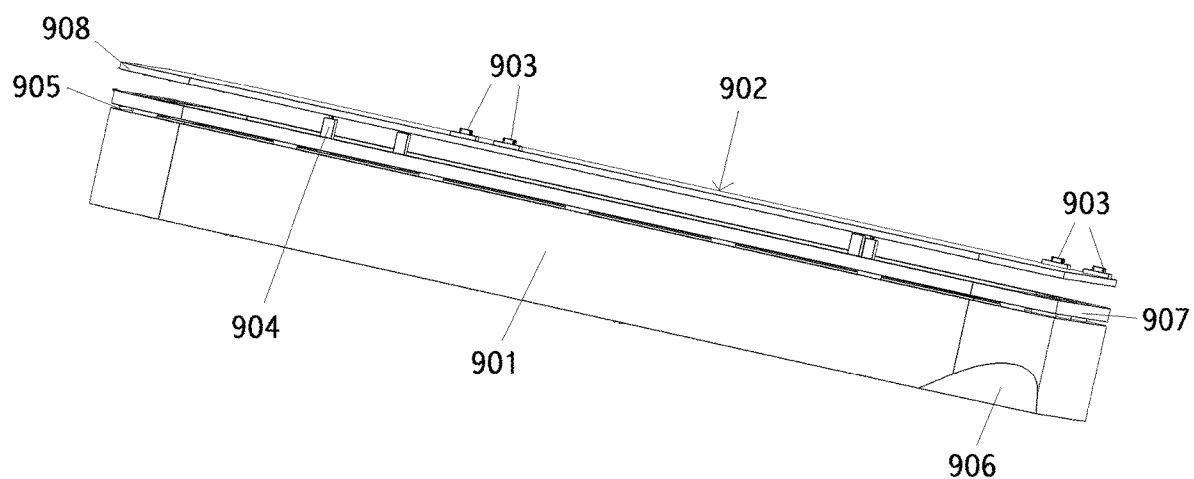
FIG. 9 shows an exemplary side view of a scale, without a skirt, showing a weighing surface and compliance element.

Turning now to FIG. 9, we see side view of a partially assembled scale. 901 shows a wall of the case. 904 shows one of four connectors; here the upper and lower connectors are shown mated. 902 is the weighing surface. 903 shows four communication LED and IR sensor components. 905 shows a side of the gasket or compliance element. 907 shows an optional cover for the gasket, 905. 906 shows a cut corner of the case. Such a cut may be helpful in positioning the scale against a matching corner of a cage. 908 is the platform. When assembled as shown, the connectors 904 penetrated the gasket 905. The Gasket forms a compliant seal around the connectors 904. The perimeter of the gasket 905, is secured to the walls of the case, 901. 907 may assist in fully securing the perimeter of the gasket to the case. Note that as shown the weighing platform 908 is free to move relative to the case, 901.

FIG. 9 shows four feet, connectors or transfer points, 904. There may be any number of these transfer points, 904: one or more. It is not necessary that the transfer points penetrate the compliance element 905. They may transfer weight directly to the platform, with the platform then connected to a floating or moving edge of the compliance element. Transfer points, 904 may have various shapes, including feet, pins, blocks, lines, or rings. They may be hollow. They may be connectors. They may comprise communication elements, including optical elements or an open optical path.

FIG. 9 shows an element of the case, 906, which may be used to position the case or scale in one or more predetermined locations within an animal cage. As discussed elsewhere herein, such locations have unique benefits. 906 may be one or more cuts, protrusions, or other shapes.

A key embodiment is that the compliance element, 905, is planer. Another key embodiment is that the compliance element, 905, is a membrane.

Figure 10:
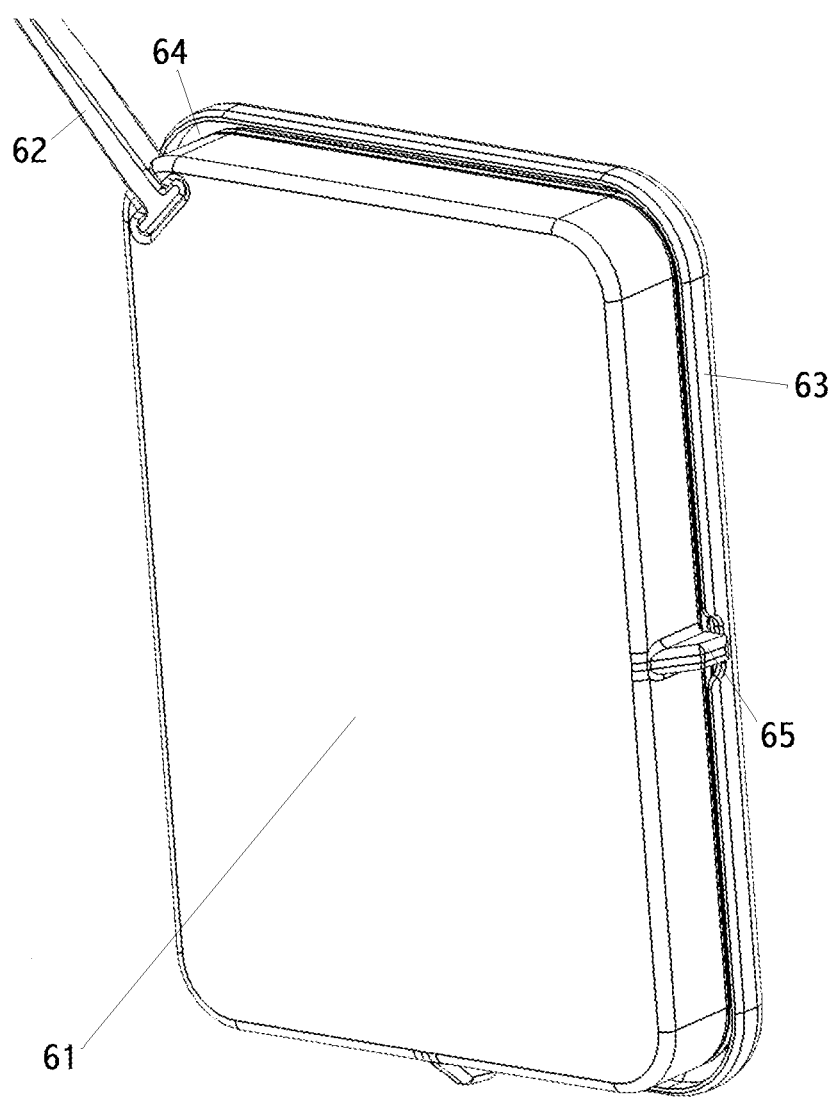
FIG. 10 shows an exemplary perspective view of the bottom of a scale and skirt.

Turning now to FIG. 10, we see a bottom perspective view of an assembled scale. The bottom of the scale is shown as 61. 65 shows a reinforcing column for the case, which may also be used to help position the scale in a cage. 63 shows a skirt around the weighing surface. A gap, 64, is visible between the skirt, 63, and the case, 61. This gap is important so that the moving module including the weighing surface, skirt, and platform may move relative to the case, 61. 62 is an optional locating arm for the scale. Such an arm is useful for consistent and accurate positioning of the scale in a cage. The arm, 62, may also be used to support or position other cage elements. The arm, 62, may be removable from the case, 61.

Figure 11:
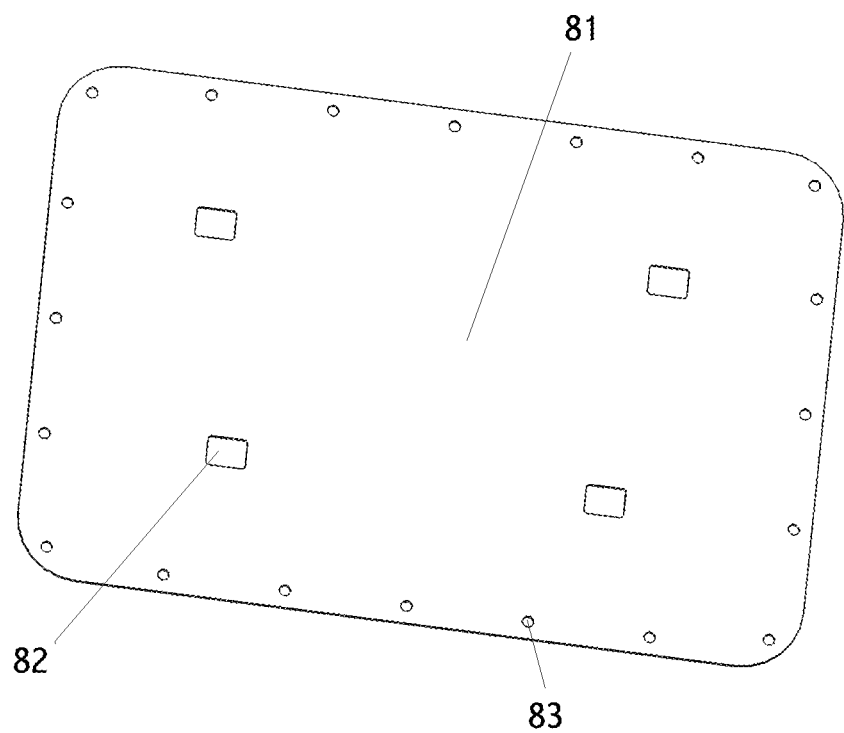
FIG. 11 shows an exemplary planar compliance element.

Turning now to FIG. 11, we see one embodiment of a compliant gasket, 81, which is one form a compliance element. The flexible gasket, 81 is secured at its perimeter to the walls of the case using a series of mounting holes, shown as 83. Four connectors penetrate the gasket through four holes, 82. A suitable gasket material may be rubber or silicone. Compliance for movement of the moving module relative to the fixed module is achieved by the stretching or compression of the gasket, 81, between the perimeter holes, 83, and the connector locations, 82. It is not necessary that the compliance element 81, have its fixed edge or edges at its perimeter. For example, the mechanical configuration may be "inside-out," whereby the fixed edge is near the center of sheet and the floating edge is near the perimeter. Thus, the feet may be more to the perimeter, and the fixed edge closer to the center. The compliance element may be in the shape of a ring, or a skirt. In a convenient mental model, the compliance element may be considered a "moat" surrounding the moving elements, such as connectors, feet or transfer points. The compliant element may also be considered a complaint partition, where here partition refers to the sterile isolation of components on one side of the compliant element as compared to the other side of the compliant element.

A key embodiment is that at least a portion of the compliance element forms at least a portion of the sterile surface, enclosing the fixed electronics, and enclosing or affixed to the platform. Of importance in some embodiments is that the compliance of the compliance element, which may be thought of as having a spring k-factor, is small compared to the k-factor of the one or more load cells. Alternatively, the compliance element k-factor is constant or linear, so that it may be easily computed as a correction on the load cells' measured weight(s). Alternatively, the compliance element k-factor may be non-linear, however it is known, so that a correction on the load cells' measured weight(s) is computationally correctable. In some embodiment, the effective compliance element k-factor is essentially zero, such as might occur with a perfect hinge.

Electronic circuitry for the battery, power supply, electronics, load cell interface, IR communication, and related circuitry is well known in the art. The batteries, 36, may be rechargeable, which may be wireless or wired through connectors not shown.

In some embodiments, systems, methods and applications, IR sensitive cameras looking into the cage. Prior art IR communication from the scale through an IR transparent portion of the sealed cage may interfere with the IR video from such cameras. Therefore, several embodiments solve this problem. One embodiment uses IR-opaque pipes or light shield extending outwards from the IR transceivers on the scale to block their IR light from reaching the one or more IR sensitive cameras. Another embodiment uses IR filters on the IR scale transceivers, or the cameras, or both, such that the IR band used by the IR communications does not overlap the IR sensitive bands of the cameras, so as to allow the cameras to record usable video or stills. Common IR bands are often identified as 940/950, 840/850, and 700/750 nm. One embodiment uses the 940/950 band for IR scale communication and the 840/850 band for IR video camera sensitivity. In yet another embodiment, the IR communications with the scale may be modulated, such as by a sine or square wave carrier frequency, or by other modulation means, including pulses, such that lower IR light amplitude is required for reliable communications that would otherwise be required for un-modulated IR. Modulation frequencies might be in the range of 1 KHz to 100 MHz, or in the range of 5 KHz to 10 MHz, or in the range of 10 KHz to 1 MHz. A suitable data rate for the scale is 9600 baud, although other data rates in the range of 100 baud to 1 Gbit/sec may be used.

In one embodiment one or more male connectors, such as two-pin connectors, are on the lower modules. These connectors are used for electrically charging the batteries in the lower module. Alternative, wireless charging may be used, either through the cage, or outside of the cage. Wireless charging configurations and circuits are well known in the art.

There may or may not be electrical connectivity between the upper and lower module. The upper module may be free of electronic components.

Some systems or methods place the wireless, sterile scale in an animal cage that is free of electrical penetrations. Such a cage may be one of many in a vivarium.

Some embodiments use a capacitive sensor in the upper module to detect the presence of an animal on the scale. Some embodiments use an array or grid of ECG electrical contact points on the top of the upper module to detect, and then transmit an ECG of an animal on the scale. Multiple ECG contact points are used so that the animal is standing on a usable number of contact points for enough time in order to take an ECG reading. Also, some contact points may be soiled or covered, for example, with urine, feces or bedding. The electronics scans the multiple ECG contact points to locate those that are in usable electrical connection with the animal. ECG data may be requested and transmitted similarly to the process used for weight value transmissions.

In one embodiment, an automated animal ID reader is combined with a wireless scale, a video feed of the interior of the animal cage, and two automated data records: one for animal location and one for animal weight. The video feed is used to generally track the location of animals within the cage. Often, an animal ID reader has a range that is less than the range of the cage. This is important so that when one animal is within that range and other animals are out of that range that the one animal in range may be uniquely and reliably identified. The video feed is then use to continually track the location of this one animal as it moves throughout the cage, at least until it goes into hiding. This process may be repeated for all of the animals in the cage. Sometimes, more than one animal hides at the same time from both the range of the automatic ID reader and the visible range of the video. In this case, when an animal re-enters the video range, it is unidentified until it enters the range of the automatic ID reader, or is identified by the process of ID'ing all the other animals in the cage.

When an animal is on a weighing surface of a scale, such as the top of a scale, and if the ID of that animal is known at the same time and location, the scale may transmit a weight, which then may be placed into the automated data record of weight for that animal.

In some cases, animals may have unique weights. That is, the weight of one animal in the cage is measurably distinct from the other animals in the cage. In this case, when such an animal is on a weighing surface of a scale in the cage, then the animal may be ID'd at that location by its weight.

In another embodiment, it is desirable to not turn on the wireless transmitter for the scale frequently. Frequent transmissions may quickly run down an in-cage battery. Therefore it is desirable to transmit weights for an animal under two conditions. First, that the weight of a known animal on the scale has changed more than a threshold amount from a prior weight, or second, that a sufficient amount of time has elapsed that a weight should be transmitted anyway. Note that if an animal on the scale is not uniquely identified or identifiable, then it is desirable to not transmit, because such weight data is typically not usable.

In another embodiment, it is desirable to not turn on the scale at all unless there is an animal on the scale. In one such variation of this embodiment, a sensor, such as a capacitive sensor, is placed next to or on a weighing surface of the scale. This sensor uses less current than the scale, so it is economical from a power consumption standpoint to use the sensor to turn on the scale only when there is an animal on it.

In one embodiment the scale is sealed, so that it may be used in a pathogen-free cage. In one embodiment the sealed scale may be chemically disinfected. In one embodiment the scale battery may be charged without electrical connectivity through the sealed scale enclosure. In one embodiment the scale may be disinfected and charged at the same time by placing it in a chemical disinfectant receptacle that also includes inductive charging capability.

In yet another embodiment, the outputs from the animal ID sensor, the video camera, the scale, the animal sensor, possibly a cage controller, or any combination or sub-combination, including combinations involving other cages or other sensor types, be networked to a system, such as a computer, that maintains the data records. Note that all computations and control algorithms may be performed inside the cage, outside the cage, proximal to the cage, in a computer in the vivarium, in a computer outside the vivarium, in the internet cloud, or in a hierarchical system, without any loss of generality or claimed scope of the claims or invention. Networks may be wired IP networks, wireless networks, WiFi, Bluetooth, cellular, or audio or optical communications, in a wide variety of technologies and protocols, as one trained in the art appreciates.

Automated animal ID sensors include RFID; vision sensors that can detect and interpret tail tattoos, ear notches, or optically visible animal tags; the use of a weight scale; and other automated animal ID methods as those trained in the art appreciate.

In some embodiments, software accepts the continual inputs from the cage sensors, aggregating and presenting the data in useful ways. Such data may be visible remotely, and presented selectively to specific individuals or groups. One such example is to compare animal weight against a baseline or control group, or to show statistical patterns. As an example of health, performance and behavior subtlety that may be detected by embodiments of this invention, animal eating, drinking, urinating and defecating times or patterns may be recorded. Such activities may be altered or occur responsive to a study variable, such as a drug being tested. For example, one drug may cause an animal's appetite to increase, but only in the period from one hour to two hours after drug intake. Prior art weighing schedules would be unable to show this effect.

In some embodiments, animal ID is determined, by an iterative process accepting as inputs from two or more separate sensors, each of which is able to monitor an animal attribute over less than 100% of its range in its cage. For example, one such sensor may be an animal weight scale, and another such sensor may be a camera. Yet another such sensor may be an RF ID reader.

In some embodiments, critical conditions are detected automatically and then create alarms, which may be remotely communicated. In some embodiments, collected data is compared to baseline, control, or other sets of data for both automated and manual comparison.

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings.

Definitions

Value of a Weight—a digital or analog weight, number, value, n-tuple, or a metric that can be used to compute a weight, or a metric derived from a weight. As one example, a simple digital reading from an analog-to-digital (A/D) converter that reads a voltage from a strain-gauge may be a "value of a weight." As the k-factor of the strain-gauge is known, as are other fixed constants and linear factors, the weight on the scale is easily computed from this value. In some contexts, a "weight" refers to this value of a weight.

Fixed—when two or more elements are fixed or affixed to each other, there may be or may not be intervening elements, such as spacers, rods, arms, washers and the like. So long as the two elements and the embodiment operate as if they are fixed, and they are effectively so mechanically coupled, the fixing is equivalent.

Electrically connected—when two or more elements are electrically or electronically connected to each other, or adapted to be so connected, there may be or may not be intervening electrical or electronic elements, including but not limited to processors, filters, communication links and the like. So long as the two elements and the embodiment operate as if they are electrically or electronically connected, and they are effectively so connected, the connecting is equivalent. Note the intervening elements may change the form, timing, filtering or aggregation of the signals or data; however, so long as data exiting the connection is responsive to the data entering the connection the connection is equivalent for the purposes of an embodiment or claim.

Portion of a flexible sheet—may be an entire sheet, such as rectangular or elliptical in shape, or a ring in shape, or a sheet with holes, or a group of sheets or strips.

Communications element—one or more electronic components that send, receive or both, digital or analog data. Methods used include but are not limited to IR light, UV light, visible light, audio, sub-audio, ultrasonic, wireless, near-field or far-field radio, haptic, or other electromagnet communications.

Mechanically couple or operatively mechanically couple—transfer weight, motion or pressure from one element to another via the mechanical coupling or operative mechanical coupling. This describes the operation of a specific element, not a functional element in a claim. For example, transfer points provide the function. "Operative" means such that the scale functions as intended. One embodiment mechanically couples from a weighing surface to the free ends of one or more load cells to effectively transfer the weight on the weighing surface to the freed ends of the one or more load cells.

Free of rigid attachment—means the upper module is free move or transmit weight as motion or as pressure to the lower module. It may sit on a flexible membrane, or another flexible support, such as rubber pads, hinges, scissors support, or other compliant coupling.

Pathogen-free—means the population of microbes, including but not limited to bacteria, viruses, prions and toxins, relevant to the experiment, are sufficiently reduced to meet the needs of the study, or to not impact the health, performance or behavior of the target animal population or of the workers.

Sterile—pathogen-free.

Sealed enclosure—an enclosure sealed against pathogens that impact or alter study results, or alter the credibility or repeatability of study results, entering or leaving the enclosure.

Transmit difference threshold—may be a percentage of weight, or an absolute weight, or a formula incorporating both the percentage and absolute values.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

We claim:

1. A weighing scale comprising:
   a fixed module comprising: a case, a fixed electronics set, one or more load cells, and a compliance element;
   a moving module comprising: an external sub-module and an internal sub-module;
   a communications element;
   wherein the external sub-module comprises: a weighing surface and one or more transfer points;
   wherein the internal sub-module comprises a platform;
   wherein the one or more transfer points operatively mechanically couple the external sub-module to the platform;
   wherein the compliance element is fixed at a fixed edge to the case;
   wherein the platform is fixed to the free ends of the one or more load cells; and
   wherein the communication element is adapted to wirelessly transmit a value of a weight on the weighing surface.

2. An animal cage comprising:
   a scale comprising;
   a fixed module comprising: a case, a fixed electronics set, one or more load cells, and a compliance element;
   a moving module comprising: an external sub-module and an internal sub-module;
   a communications element;
   wherein the external sub-module comprises: a weighing surface and one or more transfer points;
   wherein the internal sub-module comprises a platform;
   wherein the one or more transfer points operatively mechanically couple the external sub-module to the platform;
   wherein the compliance element is fixed at a fixed edge to the case;
   wherein the platform is fixed to the free ends of the one or more load cells; and
   wherein the communication element is adapted to wirelessly transmit a value of a weight on the weighing surface;
   wherein the animal cage is sterile and free of electrical penetrations.

* * * * *